Feb. 17, 1970  S. FONER  3,496,459
VIBRATING SAMPLE MAGNETOMETERS
Filed May 10, 1967  4 Sheets-Sheet 1

INVENTOR
SIMON FONER
BY
Nicholas P. Pendescio
ATTORNEY

Feb. 17, 1970     S. FONER     3,496,459

VIBRATING SAMPLE MAGNETOMETERS

Filed May 10, 1967     4 Sheets-Sheet 2

INVENTOR
SIMON FONER
BY
Nicholas A. Pandiscio
ATTORNEY

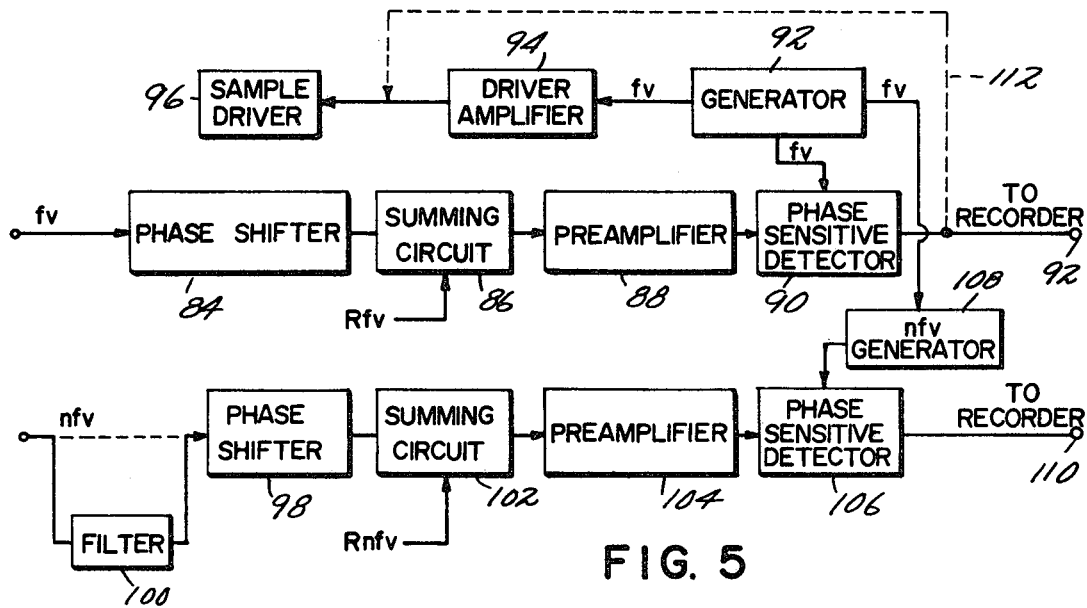
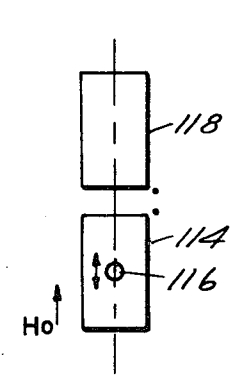
FIG. 6
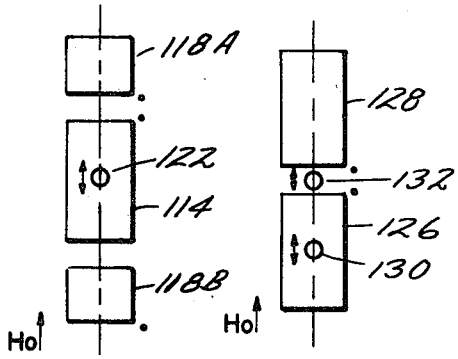
FIG. 7
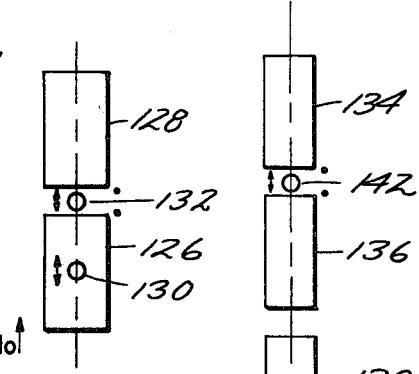
FIG. 8
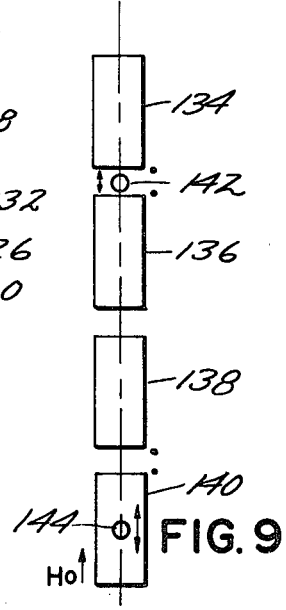
FIG. 9
INVENTOR
SIMON FONER
BY
ATTORNEY Feb. 17, 1970  S. FONER  3,496,459
VIBRATING SAMPLE MAGNETOMETERS
Filed May 10, 1967  4 Sheets-Sheet 4

INVENTOR
SIMON FONER
BY
Nicholas A. Pandiscio
ATTORNEY

United States Patent Office 3,496,459
Patented Feb. 17, 1970

3,496,459
VIBRATING SAMPLE MAGNETOMETERS
Simon Foner, 31 Payson Terrace,
Belmont, Mass. 02178
Filed May 10, 1967, Ser. No. 637,570
Int. Cl. G01r 33/02
U.S. Cl. 324—47                                      30 Claims

ABSTRACT OF THE DISCLOSURE

The specification discloses improvements in magnetometers of the general type disclosed in U.S. Patent No. 2,946,948. The invention deals with minimizing undesired background signals by means of novel inductive pickup arrangements that selectively generate signals at frequencies other than the sample vibration frequency and also at the vibration frequency. The improvements include applications for both transverse and axial sample or coil motion, methods for generating and comparing signals of first and higher harmonic, and methods for multiple sample observations. The invention also is adapted for application of various external modulation techniques (e.g. pressure, temperature, field modulation) and provides various outputs to obtain sample positioning information as well as magnetic moment data.

---

This invention relates to magnetometers adapted for measurement of the magnetic characteristics of matter and more particularly to magnetometers wherein the specimen to be evaluated (or sensor) is moved in a magnetic field and variations in said field resulting from relative oscillation of the specimen are sensed by suitable means such as an inductive pickup coil or other sensor.

PRIOR ART

Vibrating sample or coil type magnetometers are now well known in the art and are useful in measuring the magnetic moments of small specimens of matter. By definition, unit magnetic moment, in the centimeter-gram-second system, is possessed by a magnet formed by magnetic poles of opposite sign and unit strength, one centimeter apart, and may be expressed as units per gram or per cubic centimeter. Prior art magnetometers of the type relevant to the present invention embody one of two well-known techniques. In one technique the sample or the pickup coil is oscillated in a magnetic field that extends substantially parallel to the axis of the pickup coil and the axis along which the coil or sample is oscillated. This technique is exemplified in a paper by D. O. Smith, entitled, "Development of a Vibrating Coil Magnetometer," page 261, Review of Scientific Instruments, May 1956. The second technique differs from the first in that the sample is oscillated along an axis substantially perpendicular to the direction of the applied magnetic field. The latter technique is embodied in the magnetometer disclosed in my prior U.S. Patent No. 2,946,948, issued July 26, 1960, for "Magnetic Test Apparatus." These references exemplify the state of the prior art as presently known.

Operation of instruments embodying these techniques is adversely influenced or complicated by various background signal effects that stem from the oscillatory movement of the specimen or coils because of mechanical or electronic coupling. These background coupling effects can occur at random frequencies but particularly at the frequency of oscillation of the specimens or coils, and are transformed (inductively or capacitively) into unwanted usually fixed phase signals that are predominantly first harmonic, i.e., have a frequency the same as the frequency $f_v$ at which the specimens or coils are vibrated. In the magnetometer disclosed in my Patent 2,946,948 the pickup coils may be attached to the electromagnet generating the applied field in order to reduce vibration coupling between the coils and the oscillating specimen support (shock mounting devices also are used). While this arrangement tends to diminish first harmonic background effects, such small effects still exist and have a tendency to limit the overall sensitivity. Magnetometers employing pickup coils that are oscillated in a field extending parallel to the axis of the pickup coils and the axis along which the coils are oscillated are even more sensitive to mechanical vibrations, since the vibrating coils intercept the total axial field rather than presenting a small NA perpendicular to the applied field (where NA represents area turns per coil). The background effects are still severe in the case where the specimen moves parallel to the pickup coils and the magnetic field.

SUMMARY

The general object of the present invention is to provide improved methods and means for measuring the magnetic moment of a test specimen of matter.

A further object of the invention is to provide an improved magnetometer adapted for directly measuring magnetic moment as a function of temperature, magnetic field, crystallographic orientation of the test sample, pressure or other variable.

A more specific object is to provide vibratory magnetometers of the character described which are designed so that the output signal is substantially free of unwanted in-phase signals at the vibration frequency $f_v$, or the output signal frequency is removed from the driving frequency $f_v$.

Another specific object is to provide new pickup coil arrangements for minimizing background pickup for magnetometers embodying axial field configurations.

Still another specific object is to provide new pickup coil arrangements for minimizing background pickup for magnetometers embodying transverse field configurations.

Further objects of this invention are to provide a magnetometer that is capable of generating and comparing first and higher harmonic signals, employs more than one sample for comparison and signal balancing purposes, is adapted for various external modulation techniques using first or higher harmonic signals, and permits complex sample motion in space (i.e., sinusoidal, non-sinusoidal, rotational, etc.).

In a preferred embodiment of the invention the magnetometer of the character described employs inductive pickup means adapted to provide an output signal that is substantially free of first harmonic background signals. The inductive pickup means comprises one or more coils arranged to maximize generation of the second or a higher order harmonic with a given magnetic field configuration. The invention also contemplates pickup arrangements adapted to generate either or both first and second or higher harmonic signals and circuit means permitting comparison of both signals. The output signal is preferably generated by moving the test sample with respect to the pickup coils, but the same or a similar result may be achieved by moving the pickup coils instead of the test sample.

Other objects, advantages and features of the invention are set forth or rendered obvious by the following detailed specification which is to be considered together with the accompanying drawings, wherein:

FIG. 5 is a schematic diagram of another circuit adapted for use with magnetometer arrangements provided in accordance with the invention;

Figure 14:
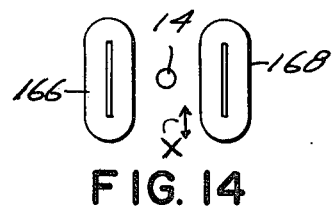
Figure 15:
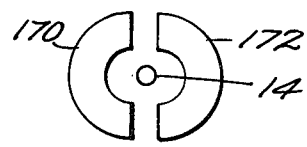

FIGS. 6–13 schematically illustrate different pickup coil arrangements provided in accordance with this invention; and FIGS. 14 and 15 are diagrammatic plan views of two types of many special coil configurations that may be employed in the practice of this invention.

Unless otherwise indicated hereinafter, "transverse" means perpendicular to the applied field $H_0$. Hence a coil is axial with respect to $H_0$ when its axis is parallel to $H_0$.

Figure 1:
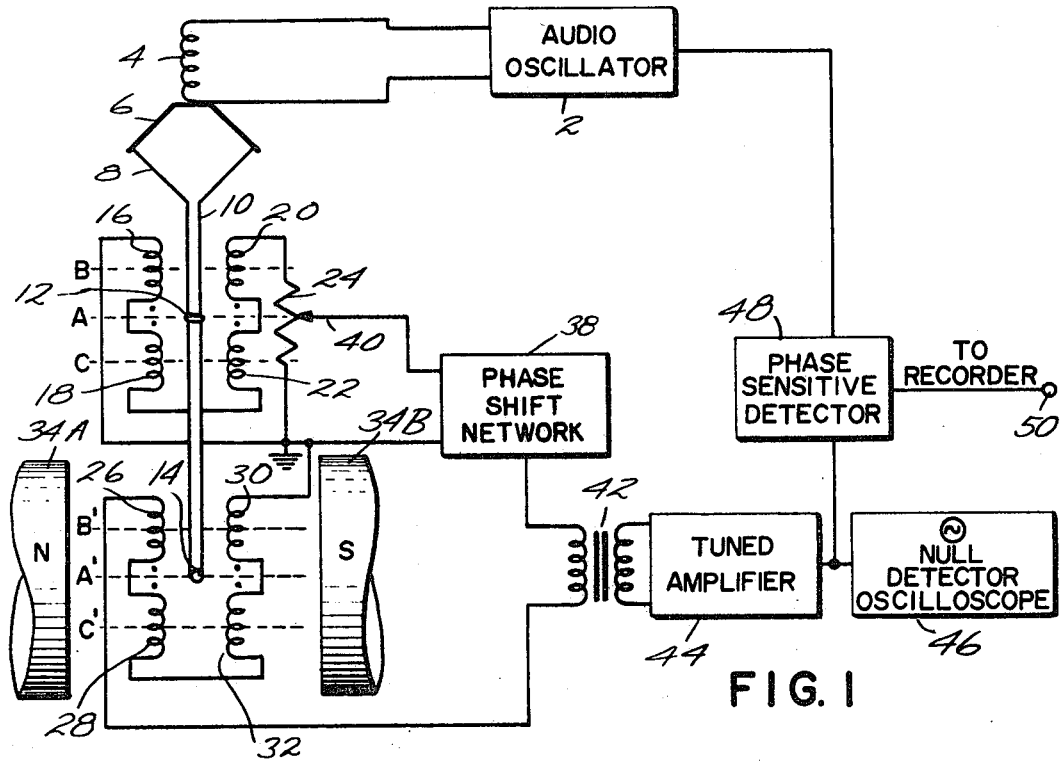
FIG. 1 is a combined block-diagrammatic illustration of a first form of magnetometer and associated circuitry embodying the invention, this embodiment comprising transversely disposed pickup coils and a transverse magnetic field.

With reference now to FIG. 1, a preferred embodiment of the invention comprises an audio oscillator 2 which energizes the coil 4 of a loudspeaker 6 whose diaphragm is joined by a support member 8 to a rod 10 to which are secured a sample 12 that serves as a reference signal source and a specimen of magnetic material 14 whose magnetic properties are to be evaluated. In this embodiment the sample 12 is a permanent magnet. However, it is to be understood that other means may be used as a reference signal source. Thus sample 12 can be replaced by an electromagnet.

Associated with rod 10 are two inductive pickup arrangements. The first inductive pickup arrangement comprises four coils 16, 18, 20 and 22 that are serially wired as indicated and are connected across the resistor element 24 of a precision potentiometer. Coils 16 and 18 are disposed on one side of rod 10 and coils 20 and 22 are disposed on the opposite side of rod 10 in positions corresponding to those of coils 16 and 18. The coils are positioned so that the at-rest position of the reference sample 12 is along the line A which runs at right angles to the coils and is equidistant from the ends of coils 16 and 20 on the one hand and coils 18 and 22 on the other hand. The second inductive pickup arrangement comprises coils 26, 28, 30 and 32 that are located and wired serially in the same manner as the coils of the first described pickup arrangement. These coils, together with test specimen 14 are positioned within a magnetic field indicated by the vector $H_0$, with the coils spaced so that the at-rest position of specimen 14 is along the line A' which is equidistant from coil pairs 26, 30 and 28, 32. The purpose of the magnetic field is to produce a magnetic moment in the specimen 14. In this particular embodiment the magnetic field is furnished by the spaced confronting poles 34A and 34B of an electromagnet, but it is to be understood that it could be provided by an equivalent permanent magnet or superconducting magnet. It also is to be appreciated that no field need be applied if specimen 14 is permanently magnetized.

Energization of speaker coil 4 will cause reference sample 12 and test specimen 14 to be reciprocated parallel to the axes of the several pickup coils and perependicular to the direction of the magnetic field. As the reference magnet 12 vibrates the coils see a varying magnetic field and as a result they generate an output signal. The test specimen 14 is effective in distorting the magnetic field in its immediate vicinity with the degree of distortion being related to the direction and magnitude of its magnetic moment for the given magnetic field and also sample size. Accordingly oscillation of the sample results in corresponding changes in the position of the sample-distorted magnetic field, and such changes induce voltages across coils 26–32 in much the same manner as voltages are induced in coils 16–22 by movement of reference sample 12. The coils in the first inductive pickup arrangement are connected with polarities as shown by the dots in FIG. 1, with the result that signals derived across the coils in response to reciprocal movement of reference sample 12 are cumulatively combined while signals induced by stray magnetic fields or by mechanical movement of the coils effectively cancel. The coils in the second inductive pickup arrangement are connected in a way similar to that of the reference pickup arrangement.

The first inductive pickup arrangement comprising serially connected coils 16, 18, 20 and 22 is connected to a phase shifter 38 via the moveable slider of the potentiometer. The phase shifter is adapted to adjust the phase of signals generated by the reference sample 12 so as to compensate for any difference in phase with respect to the signal derived by the second inductive pickup arrangement. In this connection it is to be noted that the output side of the phase shifter is connected to one side of the primary coil of a transformer 42. The other side of the same primary coil is connected to the second inductive pickup arrangement. With this circuit the signal derived from the first coil arrangement is attenuated by the potentiometer and differentially combined with the signal derived from the second coil arrangement to provide a difference output signal at the secondary coil of transformer 42. This difference output signal is in turn applied to a tuned amplifier 44 which is tuned to a frequency $2f_v$ where $f_v$ is the frequency of the output signal from oscillator 2, i.e., the frequency at which reference sample 12 and specimen 14 are vibrated. The output of tuned amplifier 44 is applied to and sensed by a null detector oscilloscope (and/or other indicating equipment) 46. It is also applied simultaneously (or alternatively) to a phase sensitive detector 48 which is activated by the signal from oscillator 2, so as to provide an output signal at terminal 50 that is suitable for energizing a conventional signal recorder.

A unique aspect of the invention as embodied in the system of FIG. 1 is the disposition of reference sample 12 and test specimen 14 with respect to coils 16–22 and coils 26–32 respectively. The reference sample 12 and specimen 14 vibrate symmetrically about A and A', respectively, under the influence of the speaker 6, preferably but not necessarily within the limits B, C and B', C', respectively. (The coils 16, 20 and 18, 22 are disposed so that the limits B, C respectively are at approximately their midpoints; the coils 26, 30 and 28, 32 are similarly disposed with respect to the limits B', C' respectively.) With this arrangement the two inductive pickups will generate signals that are substantially confined to the frequency $2f_v$. More specifically this arrangement maximizes generation of second harmonic signals and minimizes generation of first harmonic signals. Hence background signals are virtually eliminated. However, it is to be noted that the apparatus shown in FIG. 1 can also be operated so that one or both of the inductive pickups will generate signals confined mostly to the frequency $f_v$ instead of $2f_v$. This is achieved by vertically shifting the positions of the inductive pickups relative to the magnet and sample. The first inductive pickup can be made to generate signals at $f_v$ instead of $2f_v$ by shifting the coils so that magnet 12 oscillates up and down with a plane as represented by line B instead of line A as its half-way point (assuming no shift in the length of the stroke made by rod 10). The same result can be achieved by shifting coils 16–22 so that the half-way point in the stroke of the magnet is about plane as represented by line C. The second inductive pickup can be made to generate a signal that is relatively rich in the frequency $f$ and relatively free of the frequency $2f_v$ by moving coils 26–32 so that the specimen moves back and forth with the midpoint of its stroke at about line B' or line C'. An output signal containing both frequencies can be generated with either pickup arrangement by locating the coils so that magnet 12 or test sample 14, as the case may be, vibrates about a center position located between the aforementioned positions required to maximize $f_v$ and $2f_v$ signals, e.g., the specimen 14 is vibrated about a center position located between lines A' and B' (or C').

Operation of the apparatus of FIG. 1 set for generation of $2f_v$ signals will now be described. The speaker coil 4 is energized by the output produced by oscillator 2. Preferably the frequency $f_v$ of the output is relatively low, e.g., less than 1 kc./sec. As a result the rod 10, together with reference sample 12 and specimen 14, will oscillate perpendicular with respect to the magnetic field represented by the vector $H_0$ at the frequency $f_v$. This movement of the reference sample and specimen induces the two pickups to generate signals with a relatively large second harmonic content and a relatively small or substantially nil first harmonic content. The specimen signal is applied without attenuation while the relatively high level reference signal is attenuated as necessary by adjustment of slider 40. Phase shift network 38 is adjusted to bring the attenuated reference sample signal into phase coincidence with the signal derived from specimen 14. The reference signal is combined with the specimen signal in the primary of the transformer 42 so as to provide a difference signal that appears across the transformer secondary. The null detector oscilloscope 46 indicates the magnitude of the signal output of tuned amplifier 44. The potentiometer slider 40 is adjusted until the oscilloscope 46 indicates a minimum. The setting of the potentiometer slider 40 under this condition of minimum signal is then indicative of the magnetic moment of the specimen 14. Calibration is readily accomplished by inserting samples of known weight and magnetic characteristics and noting the potentiometer setting for the known magnetic moment. With this calibration procedure accomplished, other specimens may be rapidly and accurately measured. When it is desired to use a recorder connected to terminal 50, the potentiometer is fixed and the output of the tuned amplifier 44 is sampled by phase sensitive detector 48 in synchronism with a sampling signal derived from the audio oscillator 2, so as to continuously provide a signal at output terminal 50 which is indicative of the value of the magnetic moment of the specimen under test. Phase sensitive detectors of this type are well known in the art and, therefore, a detailed description thereof is not included herein.

It is apparent that the system of FIG. 1 is similar to the system shown in FIG. 1 of my prior patent, but differs therefrom in the specific coil arrangement and the positioning of specimen 14 and the reference sample 12 with respect to the coils of the inductive pickup assemblies. This modification of my prior magnetometer design has all of the advantages of the latter, but in addition it is far less sensitive to stray signals caused by mechanical vibrations or electronic coupling which tend to have a frequency equal to the sample oscillation frequency. On the other hand, an indication of the magnitude of signals caused by undesired pickup signals can be obtained by shifting the positions of the pickup coils so that their outputs will be rich in first harmonic and relatively weak in second harmonic signals. With this mode of operation the amplifier 44 would be tuned to the $f_v$ frequency. It is to be appreciated also that a second specimen may be attached to the rod 10 so that it will oscillate around the line B' or the line C'. The output signals of the two specimens may then be compared with high resolution for informative purposes. The second specimen may also be replaced by an electromagnet in order to introduce a programmed second signal.

Figure 2:
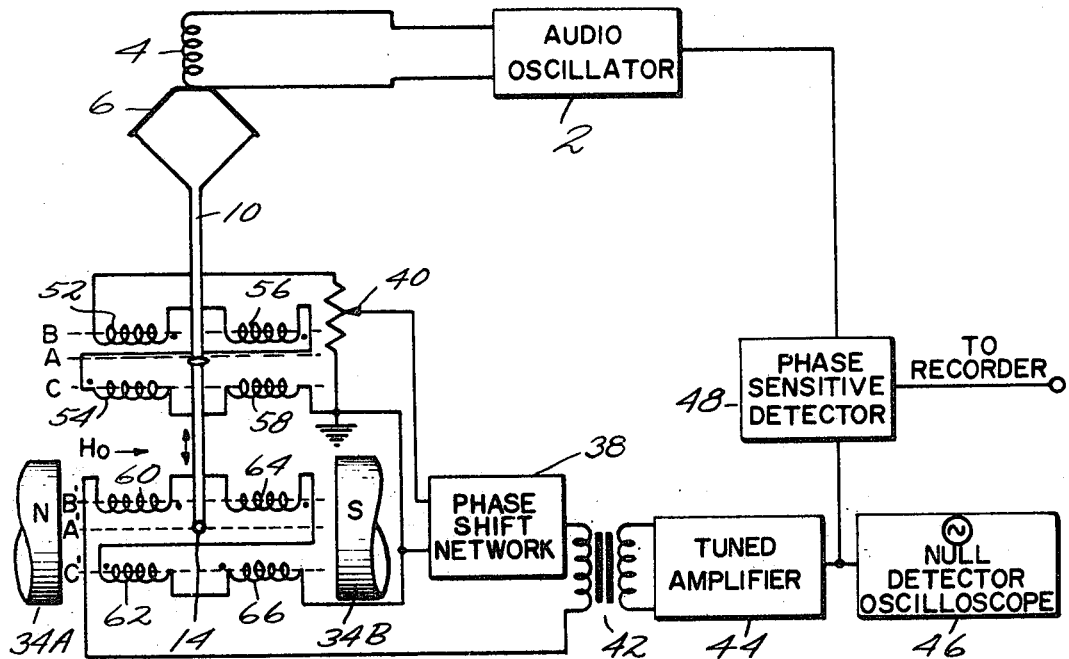
FIG. 2 is a view similar to FIG. 1 of another form of magnetometer comprising axially disposed pickup coils and a transverse field.

FIG. 2 shows still another embodiment of the invention which is adapted to selectively produce signals in which the first harmonic is maximized and the second harmonic is minimized, or vice versa. For convenience it is to be noted that the electronic measuring system is essentially the same and is operated in essentially the same manner as the electronic system of FIG. 1. In this second embodiment of the invention the rod 10 is mounted so as to reciprocate transversely to a magnetic field produced by a magnet whose poles are shown in part at 34A and 34B. The magnetic field is again indicated by the vector $H_0$. However, the inductive pickup arrangements for the reference sample 12 and the specimen 14 differ from the arrangements previously described. The first inductive pickup arrangement associated with the reference sample magnet 12 comprises four coils 52, 54, 56 and 58 which are serially connected as shown, but are disposed with their axes extending parallel to the magnetic field vector $H_0$ and perpendicularly to the rod 10. The coils are disposed so that coils 52 and 56 are in line with each other and coils 54 and 58 are in line with each other. The second inductive pickup arrangement comprises four additional coils 60, 62, 64 and 66 that are arranged in the same manner as the coils of the first inductive pickup arrangement. In this embodiment as illustrated, the reference sample 12 is initially positioned at a point along the line A which extends transversely of the rod 10 and is located equidistant from coils 52 and 56 on the one hand and coils 54 and 58 on the other hand. The two pairs of coils are spaced so that the reference sample magnet will oscillate symmetrically about A. The specimen 14 is initially positioned at a point along the line A' which is spaced equidistant from the upper and lower pairs of coils, and oscillates between the limits B' and C' which correspond in position to the maximum limits B and C for the magnet 12. With this arrangement the two inductive pickups will produce signals having a relatively large first harmonic component and a relatively small second harmonic component. To achieve the reverse effect, i.e., to maximize the second harmonic and minimize the first harmonic, the coils are positioned so that reference sample 12 and specimen 14 oscillate about a point on lines B and B' and C and C', respectively.

Figure 11A:
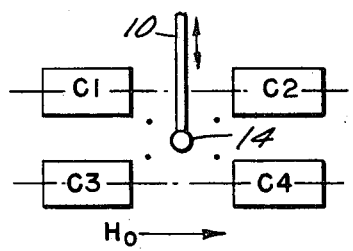
Figure 11B:
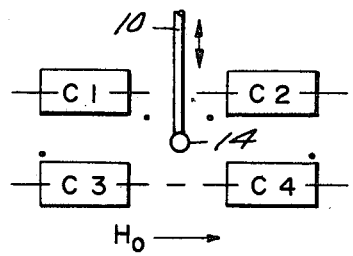

In connection with the embodiment of FIG. 2, it is to be noted also that the preferential generation of the first or second harmonic is not limited to changing the position of the sample but can be achieved by changing the polarity of the pickup coils. This is illustrated by FIGS. 11A and 11B. In these figures the blocks C1, C2, C3 and C4 represent serially connected coils oriented and spaced in the same manner as coils 60, 64, 62 and 66 respectively of FIG. 2. The specimen 14 is initially positioned as shown which is approximately the same as its initial position in FIG. 2. The coils are connected so that their polarities are as indicated in FIG. 11B. Vibration of specimen 14 perpendicularly to the field and symmetrically about A' (FIG. 2) will induce the coils to generate signals with a relatively large second harmonic content and a relatively small first harmonic content. The reverse result can be achieved by switching the coil connections so that their polarities are as shown in FIG. 11B. Of course, it is to be understood that this technique is not limited to the sample pickup but can also be applied to the inductive pickup associated with reference sample 12.

Figure 3:
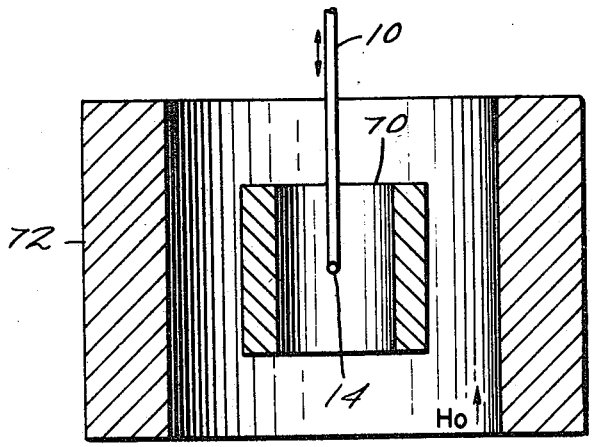
FIG. 3 is a schematic sectional view of another magnetometer arrangement comprising an axially disposed pickup solenoid located in an axial magnetic field.

FIG. 3 illustrates a further modification of the invention. In this embodiment a pickup solenoid 70 is positioned within a solenoid magnet 72 in substantially coaxial relation. The magnet's field is represented by the vector $H_o$. The rod 10 is positioned within solenoid 70 so that specimen 14 is located substantially equidistant between the upper and bottom ends of solenoid 70 in its at-rest position. It is to be understood that this arrangement may be substituted for the sample pickup and magnetic field arrangement shown in FIG. 1. A second pickup solenoid may be disposed in the same way about the reference sample 12. Vibration of the sample parallel to the field $H_o$ of solenoid magnet 72 will induce pickup solenoid 70 to generate an output signal. If the specimen vibrates up and down with respect to its initial position, the signal generated by solenoid 70 will have a relatively large $2f_v$ component and a relatively small $f_v$ component.

Figures 4A, 4B:
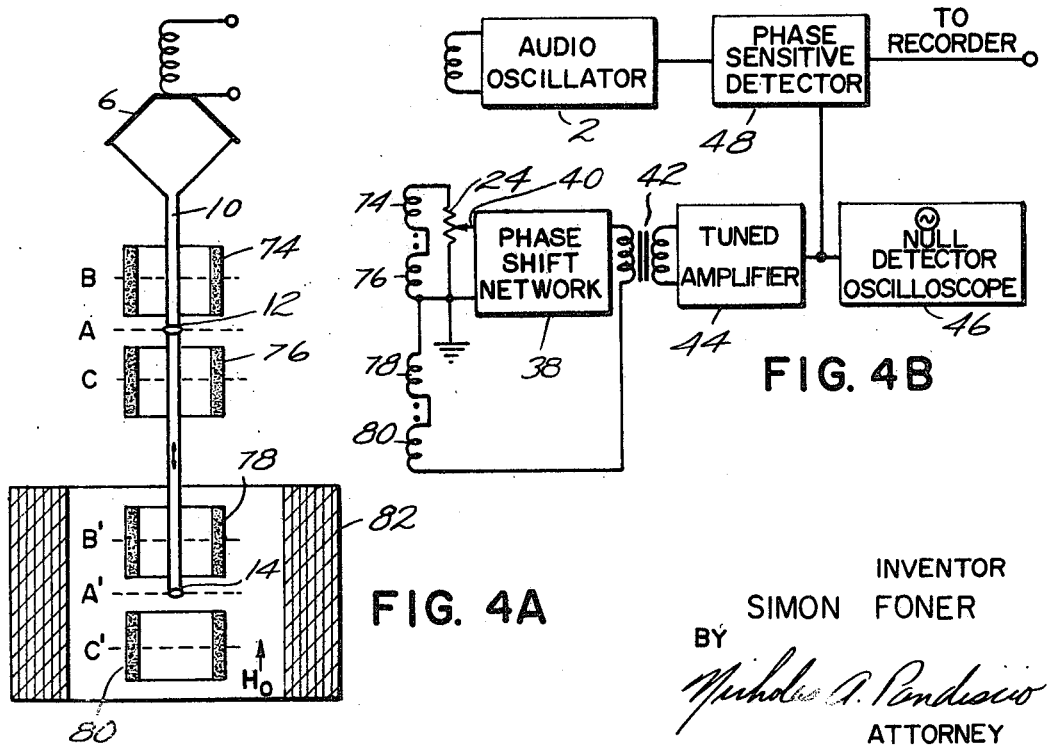
FIG. 4A is a diagrammatic representation of a second form of magnetometer comprising axially disposed pickup coils and an axial magnetic field.
FIG. 4B is a schematic representation of the electrical circuit for the magnetometer shown in FIG. 4A.

FIGS. 4A and 4B show a further modification employing a parallel field configuration. This version employs essentially the same electronic measuring system as shown in FIGS. 1 and 2 and, therefore, corresponding parts are identified by corresponding numerals. This modification is also adapted to selectively maximize generation of signals at the frequencies $f_v$ or $2f_v$. Referring first to FIG. 4A, the rod 10 is disposed so as to vibrate axially with respect to two inductive pickup arrangements comprising solenoid coils 74, 76, 78 and 80. The rod 10 extends through and is aligned with the axes of these solenoids. The reference sample 12 is positioned so that when the rod 10 is at rest it is located along the line A which is equidistant from the adjacent ends of solenoids 74 and 76. The specimen 14 is positioned so that it occupies a corresponding position along a second line A′ located equidistant between the solenoids 78 and 80. The latter solenoids are symmetrically disposed within a solenoid magnet 82 whose field is indicated by the vector $H_o$. Referring now to FIG. 4B the solenoids 74 and 76 are serially connected as shown across the potentiometer resistance element 24 and phase shift element 38, while solenoids 78 and 80 are serially connected as shown. As in the embodiment of FIG. 1, reciprocal movement of the reference sample 12 and the specimen 14 induces voltages across the solenoids 74, 76 and 78, 80 respectively, and these signals are differentially combined in the primary of transformer 42. If sample 12 and specimen 14 are initially positioned along the lines A and A′ as shown and oscillate symmetrically about A, A′, e.g., within the limits represented by lines B, C and B′, C′, the differential output signal delivered to the tuned amplifier 44 will have a relatively large first harmonic component and a relatively small second harmonic component. On the other hand, if the coils 74, 76, 78 and 80 are shifted so that reference 12 and specimen 14 oscillate about the lines B and B′, or the line C and C′, the differential output signal delivered to the amplifier will have a relatively large second harmonic component but a relatively small first harmonic component. Of course, amplifier 44 is tuned to pass the desired signal frequency.

FIG. 5 illustrates a circuit for use when two specimens are mounted on rod 10 and oscillated with respect to two separate pickups, one of which is arranged to generate signals at $f_v$ and the other of which is arranged to generate signals at $nf_v$, where $n$ is a rational number. This circuit is a dual channel system. One channel consists of a phase shifter 84 adapted to be coupled to the sample pickup which generates signals at the frequency $f_v$. The output of this phase shifter is fed to a summing circuit 86 where it is differentially combined with a reference signal $Rf_v$ of the same frequency. The latter signal may be generated by oscillation of a magnet with respect to a third pickup in the manner described above in connection with reference sample 12. The summing circuit may be of any suitable form and, may, for example, comprise a transformer arrangement similar to that of the system of FIG. 1. The output of summing circuit 86 is fed to a preamplifier 88 that preferably is sharply tuned to pass only signals at the frequency $f_v$. The output of the preamplifier in turn is coupled to a phase sensitive detector 90. The output of phase sensitive detector 90 is passed to a recorder coupled to terminal 92. The phase sensitive detector 90 is synchronized by a sampling signal with a frequency $f_v$ produced by a generator 92. The output of generator 92 is also applied to a driver amplifier 94 where it is amplified to a suitable level. This amplified output is then used to drive a sample driver 96. A DC output derived from generator 92 may be used to accurately position the sample rod. The driver 96 may be a loudspeaker arrangement as shown in FIG. 1.

The second channel includes a phase shifter 98 similar to phase shifter 84. The input to phase shifter 98 consists of the output of the sample pickup which generates signals at the frequency $nf_v$. The input may be applied directly or through a filter 100 which is designed to reject the signals at frequencies other than $nf_v$. The output of the phase shifter is passed to a summing circuit 102 that is identical to summing circuit 86. Also supplied to the summing circuit 102 is a reference signal $Rnf_v$. The latter may be derived by passing the first reference signal $Rf_v$ through a frequency multiplying circuit or by vibrating a reference sample with respect to a fourth pickup in the manner described above, or by a separate signal generator. The output of summing circuit 102 is fed to a preamplifier 104 that is similar to preamplifier 88 but is tuned to the frequency $nf_v$. The output of preamplifier 104 is fed to a phase sensitive detector 106 that is similar to phase sensitive detector 90 but is operated in synchronism with a sampling signal at the frequency $nf_v$. This sampling signal is produced by a second generator 108 that is coupled to generator 92 so as to operate in synchronism therewith. The output of detector 106 is coupled to a recorder connected to an output terminal 110. As an optional measure the signal output of detector 90 may be fed back to the sample driver 96 as indicated by the dotted line 112 and used to adjust the zero or at-rest position of the samples and magnets mounted on rod 10. As a further optional measure, the phase shifters 84 and 98 may be relocated in the circuit so as to shift the reference signals $Rf_v$ and $Rnf_v$ instead of the specimen signals $f_v$ and $nf_v$.

FIG. 6 illustrates still another pickup coil arrangement. In this case a pickup solenoid 114 is disposed in an axial magnetic field represented by the vector $H_o$. By way of example, the field may be produced by a solenoid magnet. The test specimen, represented schematically at 116, is positioned within solenoid 114 in the same manner as specimen 14 is mounted within solenoid 70 in FIG. 3. Connected in series with solenoid 114 is a second compensating solenoid 118. The two solenoids are connected in series opposition as shown. With this arrangement, movement of specimen 114 axially with respect to the two solenoids will (a) cause solenoid 114 to generate a signal having a relatively large second harmonic content and a relatively small first harmonic content, and (b) cause $f_v$ pickup due, for example, to vibration, to be cancelled by solenoids 118 and 114. By appropriately proportioning the area turns of the two solenoids, the signal generated by solenoid 118 will balance out the first harmonic component of the output from solenoid 114, so that the net output is substantially free of background effects.

FIG. 7 illustrates a further modification of the arrangement shown in FIG. 6. In this modification the solenoid 118 is replaced by two other solenoids 118A and 118B. These solenoids are each about half the size of solenoid 118 shown in FIG. 6 and are disposed at opposite ends of the solenoid 114. Solenoids 118A and 118B are wired in series opposition with solenoid 114. The test specimen 122 is vibrated axially of the solenoids with the midpoint of its stroke about halfway between the ends of solenoid 114. Movement of the specimen will cause solenoid 114 to generate a signal that is relatively rich in the second harmonic, i.e., the frequency $2f_v$. On the other hand solenoids 118A and 118B will cancel out background effect signals of the same frequency generated by the solenoid 114, so that the net output signal of the pickup arrangement is relatively free of first harmonic signals. This arrangement allows a central location of the sample in the field generating solenoid with minimum background pickup.

FIG. 8 shows a further arrangement comprising two substantially identical pickup solenoids 126 and 128 that are wired in series opposing relation. Associated with the solenoid 126 is a test specimen 130. This sample is mounted within solenoid 126 and in its at-rest position is located approximately equidistant from the opposite ends of solenoid 126. Associated with the solenoid 128 is a second specimen 132. This specimen is located between the two solenoids. It is to be appreciated that the two specimens are coupled together so as to vibrate in phase at the same frequency. With this arrangement the vibrating specimen 130 will induce solenoid 126 to generate a signal that is primarily second harmonic and specimen 132 will induce solenoid 128 to generate a signal that is primarily first harmonic, while background field effects are effectively cancelled. The output of this pickup coil arrangement may be processed by circuitry as shown in FIGS. 1 and 5. In connection with the latter circuit, it is to be noted that the solenoids may be coupled so that the signal generated by solenoid 126 is applied to one channel and the signal generated by solenoids 126 and 128 is applied to the other channel, or the combined output of solenoids 126 and 128 may be applied to both channels with one channel arranged by filters or amplifier tuning to pass only the first or second harmonic and the other channel arranged to pass either or both the first and second harmonic, according to the comparison and measurement to be made.

FIG. 9 shows another pickup arrangement adapted to generate signals at $f_v$ and $2f_v$. This embodiment comprises four series connected pickup solenoids 134, 136, 138 and 140 disposed in an axially aligned field represented by the vector $H_o$. These solenoids are connected so that solenoids 134 and 138 are in series opposing relation to coils 136 and 140, respectively. A first sample 142 is mounted between the solenoids 134 and 136 while a second sample 144 is mounted within solenoid 140. The two samples 142 and 144 may be mounted on a common rod similar to rod 10 shown in FIG. 1 so that they will vibrate in phase and at the same frequency. Vibrational movement of sample 142 will cause coils 134 and 136 to generate a first harmonic signal while corresponding movement of sample 144 will cause coil 140 to generate the second harmonic signals. It is to be noted that the coil 138 performs the same function as compensating coil 118 shown in FIG. 6, balancing out background signals generated in coil 140.

Figure 10:
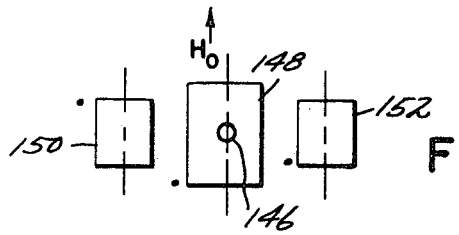

FIG. 10 illustrates another pickup arrangement. In this arrangement a specimen 146 is mounted so as to vibrate within a pickup solenoid 148 in an axial field represented by the vector $H_o$. The specimen is substantially aligned with the axis of coil 148 and is positioned so as to vibrate substantially about the midpoint of the solenoil coil. Also included in this inductive pickup arrangement are two other coils 150 and 152 that are positioned on opposite sides of coil 148 with their axes extending parallel to the magnetic field. The three solenoids are connected in series but with solenoid 150 in series opposing relation to solenoid 152. Specimen 146 causes the coil 148 to generate a strong essentially second harmonic signal which may be measured in the manner described above to provide an evaluation of the specimen's magnetic moment along $H_o$ and first harmonic signals are generated by the series connected coils 150 and 152 for that component of magnetic moment perpendicular to $H_o$ and in the plane containing the axes of coils 150 and 152. It is to be appreciated that the arrangement illustrated in FIG. 10 may be modified to the extent that the pickup coil 148 may be replaced by two or more coils as illustrated in FIGS. 6 and 7 in order to minimize background pickup, as well as by multiplicities of coils as described hereafter.

Figure 12:
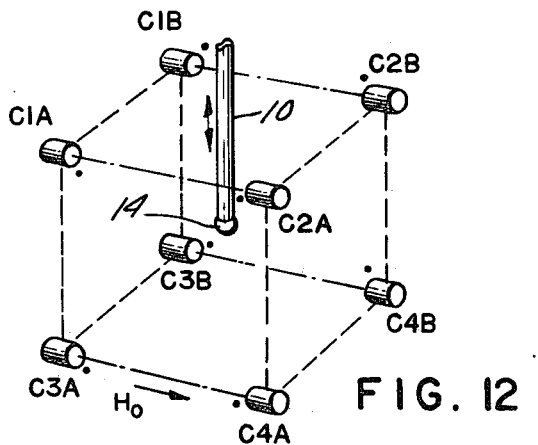

FIG. 12 is a variation of the embodiments shown in FIGS. 11A and 11B. Essentially, the embodiment of FIG. 12 comprises two groups of coils arranged substantially in the manner illustrated in FIG. 11A. More precisely, the inductive pickup arrangement of FIG. 12 comprises four solenoids C1A, C2A, C3A and C4A arranged in a common plane in the manner of coils C1, C2, C3 and C4 of FIG. 11A. The second group consists of four identically positioned coils C1B, C2B, C3B and C4B arranged in a second parallel plane. Essentially, the eight solenoids define a cube. The specimen 14 carried by rod 10 is centrally located with respect to the eight solenoids. The specimen is vibrated by the rod 10 in a direction perpendicular to the applied field $H_o$ and also to the axes of the eight solenoids. The eight solenoids may be connected together so as to form a single inductive pickup arrangement or they may be connected in two separate groups, with the signals generated by the two groups being applied as a single input or as two inputs. If the solenoids are connected with polarities as shown in FIG. 12, they will pick up the second harmonic component in preference to the first harmonic component. On the other hand if the solenoids are connected with their polarities as shown in FIG. 11B, they will pick up the first harmonic component. In this connection it is to be realized that the first group of solenoids C1A–C4A may be connected in the manner illustrated in FIG. 11A while the second group of solenoids C1B–C4B may be connected in the manner illustrated in FIG. 11B, so that the first group will pick up the second harmonic and the second group will pick up the first harmonic, with the signals of the two groups being applied as separate inputs to the circuit of FIG. 5. Here the inputs would be sensitive to sample position between the A and B planes. Note that wherever possible symmetric arrays are employed to avoid such effect. By making rod 10 and the specimen vibrate in the A plane (and eliminating the B coils) or vice versa, i.e., produce the configuration of 11A or 11B, and using the polarity of 11A or 11B it is possible again to get 2nd or 1st harmonic and maintain the saddle point for sample position. A further modification is possible using the basic arrangement shown in FIG. 12. This further modification involves rotating coils C1B, C3B, C2A and C4A clockwise ninety degrees about the vertical vibration axis, and rotating coils C1A, C3A, C1B and C3B counterclockwise ninety degrees about the same axis. Still other orientations in space are possible to provide still further information about the magnetic properties of the test specimen, e.g., rotation of all of the coils of FIG. 12 about axes normal to the A plane and applying polarities as indicated in FIG. 13 considered as a side view.

Figure 13:
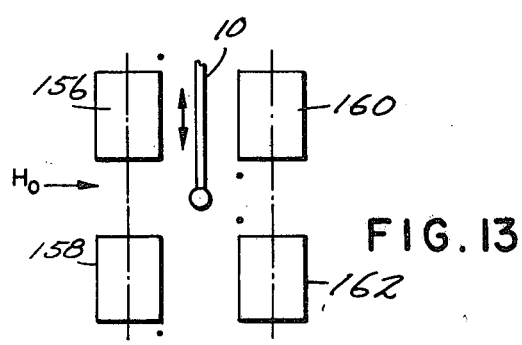

FIG. 13 illustrates a further embodiment of the invention. In this case the inductive pickup arrangement comprises four coils 156, 158, 160 and 162. The coils 156 and 158 are disposed on one side of the specimen 14 and the rod 10 while the second pair of coils 160 and 162 are disposed on the opposite side of the specimen in coplanar relation with the coils 156 and 158. The coils are connected in series with polarities as indicated in FIG. 12. The applied field represented by the vector $H_o$ extends at right angles to the direction of vibration of the specimen 14 and also to the principal axes of the four coils 156–162. The specimen is initially located at a point on a line extending parallel to the vector $H_o$ and located equidistant from the coils 156 and 160 on the one hand and coils 158 and 162 on the other hand. With this arrangement, vibration of specimen 14 will cause the four coils to pick up the second harmonic component. This same arrangement can be modified to pick up the first harmonic component. This is accomplished by switching the connections of the coils so that the polarities of coils 158 and 162 are reversed. Of course, this embodiment and others described previously may be constructed with a switching system to facilitate polarity reversal.

It is to be appreciated that not only the locations and connections of the pickup coils but also their specific configurations influence the harmonics that are generated. By varying the shape of the pickup coil it is possible to favor generation of the first rather than the second harmonic or vice versa, and even higher harmonics.

FIGS. 14 and 15 are top views which show two additional coil configurations that may be used in the practice of the present invention. In FIG. 14 two coils 166 and 168 of elliptical cross section are positioned on opposite sides of the specimen 14. It is to be appreciated that the coils with a configuration as shown at 166 and 168 could be substituted in the various pickup arrangements previously described. FIG. 15 shows two coils 170 and 172 positioned on opposite sides of the specimen 14, such coils having a semi-cylindrical configuration. This type of coil configuration also may be used in the pickup arrangements described above. The shape illustrated in FIG. 14 offers the advantage that they are less sensitive to sample position in the $x$ direction.

Although the foregoing description and the accompanying drawings disclose a substantial number of different pickup arrangements which essentially comprise one or more coils, it is to be appreciated that the invention also embraces many other inductive arrangements that are believed obvious to persons skilled in the art in the light of the above teaching. It is to be understood also that the other types of pickup elements may be used to derive specimen and reference signals. For example, Hall effect, magneto resistive, or capacitive pickups may be used in place of the inductive pickup arrangement described herein for appropriate reference or test specimen signal generation.

It also is to be noted that the invention is not limited to generation of first and second harmonics but applies to other harmonics as well. These are achieved by appropriate coil configurations or by arranging coils in the proper combinations. For example, higher harmonics can be generated by using a plurality of coils that are arranged as shown in FIG. 9 and which are small compared to the length of the stroke of the test sample. The harmonics generated by such an arrangement will depend on the number of coils used. It is to be noted also that the invention is not limited to coils whose axes are parallel or perpendicular to the direction of movement of the sample and/or the direction of the magnetic field. In principle the coils may be oriented in any direction in space with appropriate symmetry and balancing. It is to be appreciated also that where the pickup arrangement comprises a plurality of coils, they need not be aligned or parallel (as, for example, in FIG. 11A) but instead may be angularly displaced about the axis of vibration of the specimen 14. The invention is also adapted for long and short stroke movement of the sample (with arbitrary waveforms for suitable frequency outputs), so that in the case of the embodiment illustrated in FIG. 9, for example, the specimen 144 could be oscillated with a stroke extending from the position shown to a corresponding position relative to the coil 134. The lengthening of the stroke offers the advantage of facilitating generation of higher order harmonics as explained above. It also permits exposing the sample to two different environments at closely spaced time intervals.

Still other variations of the invention permitting even more extensive evaluation and comparison of test specimens can be achieved by A.C. modulation of the applied magnetic field, as well as modulation of temperature and pressure. A complex waveform drive signal also may be used. In each case the output signal may be inspected to see the effects of modulation and detect selected Fourier components.

It is to be appreciated that the detailed mechanical construction of the magnetometer may vary substantially without departing from the principles of this invention. Thus the basic mechanical construction may be similar to that shown in FIG. 2 of my prior Patent 2,946,948, or may embody some other design suitable for the purposes of this invention.

It is to be understood that the invention is not limited in its application to the details of construction and arrangement of parts specifically described or illustrated, and that many other variations are possible. Thus, for example, with respect to the embodiment of FIG. 10, it is possible by reversing the polarity of coil 152 to get a second harmonic output from both 148 and the combination of coils 150–152, while balancing out background signals by appropriate choice of effective area turns. Furthermore coils 150 and 152 may be replaced by a single concentric and coaxial coil surrounding coil 148 to again balance out background while obtaining second harmonics. Accordingly within the scope of the appended claims, the invention may be practiced otherwise than as specifically described or illustrated.

I claim:

1. Apparatus for determining the magnetic properties of a specimen of matter disposed in a magnetic field comprising means for oscillating said specimen at a selected frequency $f_v$ along a predetermined axis in said field, and pickup means located in said field in proximity to said specimen for providing an output including primarily signals with frequencies $nf_v$ indicative of magnetic field variations resulting from oscillations of said sample, where $n$ is a rational number other than 1.

2. Apparatus as defined by claim 1 wherein said pickup means operates inductively.

3. Apparatus as defined by claim 2 wherein said pickup means comprises at least one solenoid.

4. Apparatus as defined by claim 3 wherein said pickup means comprises a pair of solenoids connected in series opposing relation to each other, said solenoids arranged about and having their axis substantially parallel to said predetermined axis of oscillation, said solenoids being spaced axially of each other so that said specimen oscillates within only one of said solenoids.

5. Apparatus as defined by claim 4 wherein said specimen is oscillated parallel to the direction of said magnetic field.

6. Apparatus as defined by claim 5 further including means for oscillating a second specimen and further including a second pair of solenoids arranged with respect to each other in the same manner as the first-mentioned pair of solenoids, said second pair of solenoids disposed so that said second specimen oscillates within at least part of each member of said second pair of solenoids.

7. Apparatus as defined by claim 6 further including circuit means for comparing the output signal produced by oscillation of said first specimen with the output signal produced by oscillation of said second specimen.

8. Apparatus as defined by claim 3 wherein said pickup means comprises a plurality of solenoids connected in series opposing relation to each other, said solenoids having their axes substantially parallel to said axis of oscillation, and being spaced axially of each other so that the stroke of said specimen carries it past at least one of said solenoids.

9. Apparatus as defined by claim 8 wherein said solenoids are spaced so that the stroke of said specimen carries it past more than one of said solenoids.

10. Apparatus as defined by claim 3 wherein said pickup means comprises a pair of solenoids connected in series opposing relation to each other, said solenoids arranged about and having their axis substantially parallel to said predetermined axis of oscillation, said solenoids being spaced axially of each other so that said specimen oscillates within both of said solenoids.

11. Apparatus as defined by claim 5 further including means for oscillating a second specimen along the same predetermined axis but in the region between said solenoids, whereby the output signal generated by said solenoids is also indicative of magnetic field variations resulting from oscillation of said second specimen.

12. Apparatus as defined by claim 11 including circuit means for comparing the component of said output signal produced by oscillation of said first specimen with the component of said output signal produced by oscillation of said second specimen.

13. Apparatus as defined by claim 3 wherein said magnetic field is produced by a solenoid magnetic surrounding said at least one solenoid.

14. Apparatus as defined by claim 3 wherein the axis of oscillation of said specimen is perpendicular to said field or its magnetic moment.

15. Apparatus as defined by claim 3 wherein the axis of oscillation of said specimen is parallel to its magnetic moment.

16. Apparatus as defined by claim 3 further including means for driving said oscillating means with a complex waveform drive signal.

17. Apparatus as defined by claim 3 wherein said pickup means comprises a first solenoid disposed so that said specimen oscillates within it and a second solenoid surrounding said first solenoid is substantially concentric relation therewith.

18. Apparatus for determining the magnetic properties of a specimen of matter disposed in a magnetic field comprising means for oscillating said specimen at a selected frequency $f_v$ along a predetermined axis in said field, and pickup means located in said field in proximity to said specimen and arranged to provide an output including signals with frequencies $nf_v$ indicative of magnetic field variations resulting from oscillations of said sample, where $n$ is a rational number other than 1, said pickup means operating inductively and comprising three solenoids with one of them connected in series opposing relation to the other two solenoids, said three solenoids being arranged about and having their axes substantially parallel to said predetermined axis of oscillation, said one solenoid being located between said other two solenoids and disposed so that said specimen oscillates within said one solenoid.

19. Apparatus as defined by claim 18 wherein the combined area turns of said two other solenoids together substantially match the area turns of said one solenoid.

20. Apparatus for determining the magnetic properties of a specimen of matter disposed in a magnetic field comprising means for oscillating said specimen at a selected frequency $f_v$ along a predetermined axis in said field, and pickup means located in said field in proximity to said specimen and arranged to provide an output including signals with frequencies $nf_v$ indicative of magnetic field variations resulting from oscillations of said sample, where $n$ is a rational number other than 1, said pickup means comprising three solenoids with their axes substantially parallel to said axis of oscillation, one of said solenoids arranged about said axis of oscillation and the other two solenoids arranged on opposite sides one solenoid, said other two solenoids connected in series opposing relation with each other and said one solenoid disposed so that said specimen oscillates within it.

21. Apparatus for determining the magnetic properties of a specimen of matter disposed in a magnetic field comprising means for oscillating said specimen at a selected frequency $f_v$ along a predetermined axis in said field, and pickup means located in said field in proximity to said specimen and arranged to provide an output including signals with frequencies $nf_v$ indicative of magnetic field variations resulting from oscillations of said sample, where $n$ is a rational number other than 1, said pickup means comprising four solenoids disposed with their axes parallel to said axis of oscillation, one pair of said solenoids disposed on one side of said axis of oscillation and the other pair disposed to another side of said axis of oscillation, said four solenoids connected together so that the members of said one pair are connected in series opposing relation to each other and the members of said other pair are connected in series opposing relation to each other whereby signals produced by each of said solenoids due to mechanical vibration thereof effectively cancel.

22. Apparatus as defined by claim 21 wherein said specimen is vibrated so that the midpoint of its stroke is substantially in the region between the members of said one pair of solenoids.

23. Apparatus for determining the magnetic properties of a specimen of matter disposed in a magnetic field comprising means for oscillating said specimen at a selected frequency $f_v$ along a predetermined axis in said field, and inductive pickup means located in said field in proximity to said specimen and arranged to provide an output including signals with frequencies $nf_v$ indicative of magnetic field variations resulting from oscillations of said sample, where $n$ is a rational number other than 1, said pickup means comprising four solenoids disposed so that their axes extend at approximately right angles to said axis of oscillation, with one pair of said solenoids located to one side of said axis of oscillation and the other pair of said solenoids located to another side of said axis of oscillation, said solenoids being series connected so that signals produced by each of said solenoids due to mechanical vibration or other $f_v$ sources thereof effectively cancel.

24. Apparatus as defined by claim 23 wherein each member of one pair of solenoids is axially aligned with a member of the other pair of solenoids, and further wherein one pair of axially aligned solenoids is located so that the midpoint of the stroke of the specimen is substantially between said one pair of axially aligned solenoids.

25. Apparatus for determining the magnetic properties of a specimen of matter disposed in a magnetic field comprising means providing a magnetic field extending in a predetermined direction, means for oscillating a specimen at a selected frequency $f_v$ along a predetermined axis of oscillation within said field, pickup means responsive to oscillation of said specimen for generating a complex wave output signal that is indicative of the magnetic moment of said sample in said field and includes the frequency $f_v$ and higher order harmonics thereof with the signal strength being greatest at the frequency $nf_v$ where $n$ is a rational number other than 1, and means for detecting said output signal.

26. Apparatus as defined by claim 25 wherein said detecting means is adapted to selectively detect the $2f_v$ content of said output signal.

27. Apparatus as defined by claim 25 wherein said pickup means is adapted by a change in position relative to said specimen to generate an output signal having its greatest strength at the frequency $f_v$, and further wherein said detecting means is adapted to selectively detect signals at the frequency $f_v$ or the frequency $nf_v$ where $n$ is a rational number.

28. Apparatus as defined by claim 27 wherein said detecting means comprises an amplifier tuneable selectively to $f_v$ or $nf_v$.

29. Apparatus as defined by claim 25 further including a magnetized element arranged to oscillate in synchronism with said specimen, second pickup means associated with said magnetized element for producing a second output signal in response to oscillation of said magnetized element, means for differentially combining the output signals from both said pickup means to provide a difference output signal, and means for detecting the amplitude of said difference output signal.

30. Apparatus for determining the magnetic properties of a specimen of matter having a magnetic moment, comprising means for oscillating said specimen at a selected frequency $f_v$ along a predetermined axis, and pickup means located in proximity to said specimen for providing an output including substantially only signals with frequencies $nf_v$ indicative of magnetic field variations resulting from oscillation of said specimen, where $n$ is a rational number other than 1.

References Cited

UNITED STATES PATENTS 2,946,948  7/1960  Foner _____ 324—47

FOREIGN PATENTS 709,048  8/1941  Germany.
764,393  8/1953  Germany.

OTHER REFERENCES

Foner, S.: "Vibrating Sample Magnetometer," The Review of Scien. Instr., July 1956, p. 548.

Foner, S.: "Versatile and Sensitive Vibrating-Sample Magnetometer," The Review of Scien. Inst., vol 30, No. 7, July 1959, pp. 548–557 (324–43).

Lubell et al.: "Vibrating Sample Magnetometer," The Review of Scien. Inst., vol. 31, No. 2, February 1960, pp. 207–208.

Speliotis et al.: "Testing Tape With a Magnetometer," IBM Tech. Disclosure Bull., vol. 6, No. 8, January 1964, pp. 48–49 (324–43).

RUDOLPH V. ROLINEC, Primary Examiner

R. J. CORCORAN, Assistant Examiner

U.S. Cl. X.R.

324—14

PO-1050
(5/69)

UNITED STATES PATENT OFFICE
CERTIFICATE OF CORRECTION

Patent No. 3,496,459      Dated February 17, 1970

Inventor(s)      SIMON FONER

It is certified that error appears in the above-identified patent and that said Letters Patent are hereby corrected as shown below:

Claim 17

Line 4

The word "is" should be "in"

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents